US006782958B2

(12) United States Patent
Liang et al.

(10) Patent No.: US 6,782,958 B2
(45) Date of Patent: Aug. 31, 2004

(54) HARDFACING FOR MILLED TOOTH DRILL BITS

(75) Inventors: Dah-Ben Liang, The Woodlands, TX (US); Alysia White, Fulshear, TX (US); Greg Lockwood, Houston, TX (US); Anthony Griffo, The Woodlands, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 10/108,965

(22) Filed: Mar. 28, 2002

(65) Prior Publication Data

US 2003/0183425 A1 Oct. 2, 2003

(51) Int. Cl.$^7$ .............................................. E21B 10/46
(52) U.S. Cl. ........................ 175/374; 175/375; 175/425; 175/435; 75/240
(58) Field of Search ................................ 175/374, 375, 175/425, 435, 324, 325; 75/240

(56) References Cited

U.S. PATENT DOCUMENTS

| 5,492,186 A | 2/1996 | Overstreet et al. .......... 175/374 |
| 5,733,664 A | * 3/1998 | Kelley et al. ................ 428/457 |
| 5,791,422 A | 8/1998 | Liang et al. ................. 175/374 |
| 5,944,127 A | 8/1999 | Liang et al. ................. 175/374 |
| 6,248,149 B1 | 6/2001 | Massey et al. ................ 75/236 |

OTHER PUBLICATIONS

United Kingdom Combined Search and Examination Report, dated Aug. 13, 2003, 5 pages.

* cited by examiner

Primary Examiner—David Bagnell
Assistant Examiner—G. M. Collins
(74) Attorney, Agent, or Firm—Osha & May L.L.P.

(57) ABSTRACT

In one embodiment, a hardfacing composition for a drill bit, including a carbide phase including from about 50% to about 80% by weight of the hardfacing composition of a combination of 80 to 200 mesh macro-crystalline tungsten carbide and 80 to 200 mesh crushed cast carbide, the crushed cast carbide being about 5% to 50% of the total weight of the carbide phase, and a binder alloy comprising about 20% to about 50% by weight of the hardfacing composition is disclosed. A hardfacing composition for a drill bit, including a carbide phase composed of sintered tungsten carbide having a particle size from about 80 to 200 mesh that is about 50% to about 80% by weight of the hardfacing composition, and a binder alloy forming about 20% to about 50% by weight of the hardfacing composition.

8 Claims, 3 Drawing Sheets

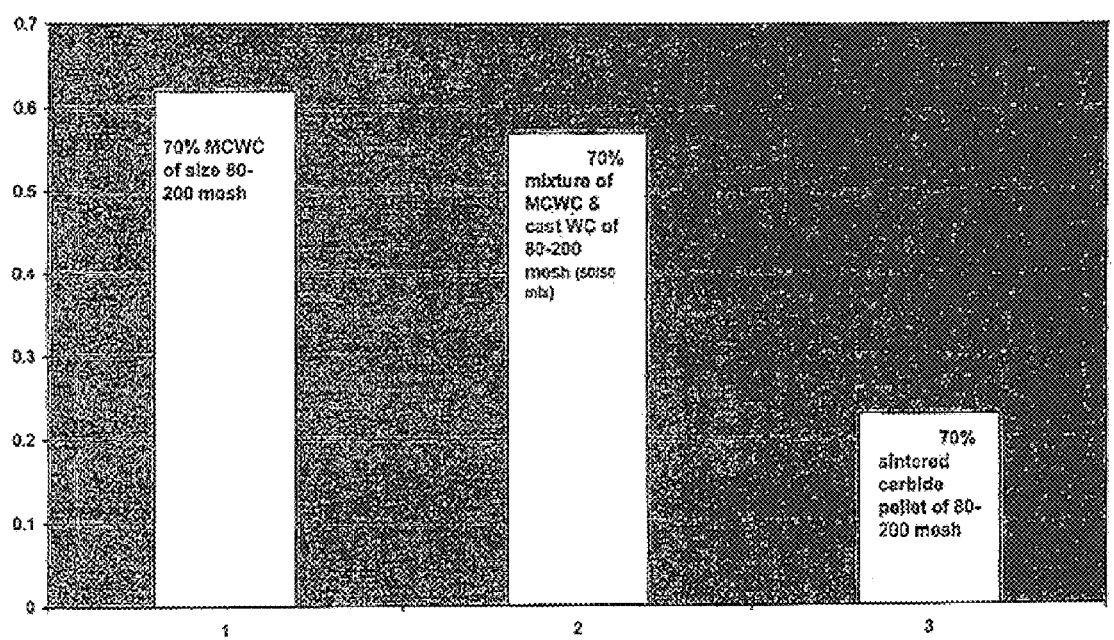

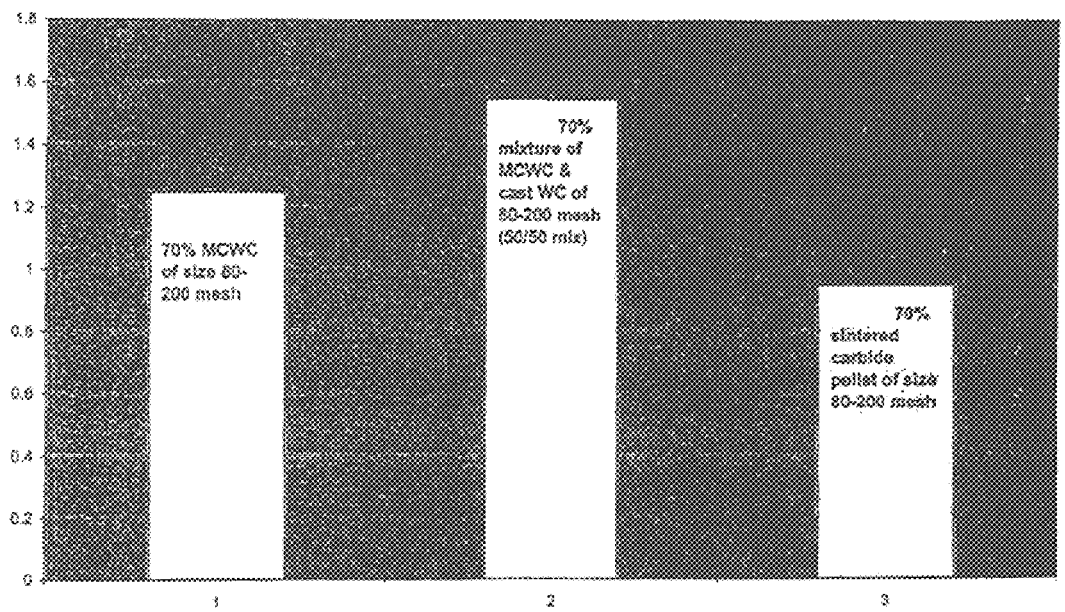

HARDFACING FOR MILLED TOOTH DRILL BITS

BACKGROUND OF INVENTION

1. Field of the Invention

The invention relates generally to hardfacing compositions. More specifically, the present invention relates to hardfacing compositions for use on milled tooth drill bits.

2. Background Art

Drill bits used to drill wellbores through earth formations generally are made within one of two broad categories of bit structures. Drill bits in the first category are generally known as "fixed cutter" or "drag" bits, which usually include a bit body formed from steel or another high strength material and a plurality of cutting elements disposed at selected positions about the bit body. The cutting elements may be formed from any one or combination of hard or superhard materials, including, for example, natural or synthetic diamond, boron nitride, and tungsten carbide.

Drill bits of the second category are typically referred to as "roller cone" bits, which include a bit body having one or more roller cones rotatably mounted to the bit body. The bit body is typically formed from steel or another high strength material. The roller cones are also typically formed from steel or other high strength material and include a plurality of cutting elements disposed at selected positions about the cones. The cutting elements may be formed from the same base material as is the cone. These bits are typically referred to as "milled tooth" bits. Other roller cone bits include "insert" cutting elements that are press (interference) fit into holes formed and/or machined into the roller cones. The inserts may be formed from, for example, tungsten carbide, natural or synthetic diamond, boron nitride, or any one or combination of hard or superhard materials.

Milled tooth bits include one or more roller cones rotatably mounted to a bit body. The one or more roller cones are typically made from steel and include a plurality of teeth formed integrally with the material from which the roller cones are made. Typically, a hardfacing material is applied, such as by arc or gas welding, to the exterior surface of the teeth to improve the wear resistance of the teeth. The hardfacing material typically includes one or more metal carbides, which are bonded to the steel teeth by a metal alloy ("binder alloy"). In effect, the carbide particles are suspended in a matrix of metal forming a layer on the surface. The carbide particles give the hardfacing material hardness and wear resistance, while the matrix metal provides fracture toughness to the hardfacing.

Many factors affect the durability of a hardfacing composition in a particular application. These factors include the chemical composition and physical structure (size and shape) of the carbides, the chemical composition and microstructure of the matrix metal or alloy, and the relative proportions of the carbide materials to one another and to the matrix metal or alloy.

The metal carbide most commonly used in hardfacing is tungsten carbide. Small amounts of tantalum carbide and titanium carbide may also be present in such material, although these other carbides are considered to be deleterious. It is quite common to refer to the material in the hardfacing merely as "carbide" without characterizing it as tungsten carbide. It should be understood that as used herein, "carbide" generally refers to tungsten carbide.

Many different types of tungsten carbides are known based on their different chemical compositions and physical structure. Three types of tungsten carbide commonly used in hardfacing drill bits are cast tungsten carbide, macro-crystalline tungsten carbide, and cemented tungsten carbide (also known as sintered tungsten carbide), the most common among these being crushed cast carbide.

Tungsten generally forms two carbides, monotungsten carbide (WC) and ditungsten carbide ($W_2C$). Tungsten carbide may also exist as a mixture of these two forms with any proportion between the two. Cast carbide is a eutectic mixture of the WC and $W_2C$ compounds, and as such the carbon content in cast carbide is sub-stoichiometric, (i.e., it has less carbon than the more desirable WC form of tungsten carbide). Cast carbide is prepared by freezing carbide from a molten state and crushing and comminuting the resultant particles to the desired particle size.

Macro-crystalline tungsten carbide is essentially stoichiometric WC in the form of single crystals. While most of the macro-crystalline tungsten carbide is in the form of single crystals, some bicrystals of WC are found in larger particles. Macro-crystalline WC is a desirable hardfacing material because of its toughness and stability.

The third type of tungsten carbide used in hardfacing is cemented tungsten carbide, also known as sintered tungsten carbide. Cemented tungsten carbide comprises small particles of tungsten carbide (e.g., 1 to 15 microns) bonded together with cobalt. Cemented tungsten carbide is produced by mixing organic wax, tungsten carbide and cobalt powders, pressing the mixed powders to form a green compact, and "sintering" the composite at temperatures near the melting point of cobalt. The resulting dense cemented carbide can then be crushed and comminuted to form particles of cemented tungsten carbide for use in hardfacing.

As mentioned above, conventional hardfacing of milled-tooth bits usually comprises particles of tungsten carbide that are bonded to the steel teeth using a metal alloy. Most hardfacing on rock bits uses steel as the matrix (base), although other alloys may also be used. Steel or other alloys will generally be referred to as a binder alloy, and hardfacing compositions are typically applied from tube rods as disclosed in, for example, U.S. Pat. No. 5,250,355 issued to Newman et al.

A typical technique for applying hardfacing to the teeth on a rock bit is by oxyacetylene or atomic hydrogen welding. A welding "rod" or stick is typically formed as a tube of mild steel sheet enclosing a filler that mainly comprises carbide particles. The filler may also include deoxidizer for the steel, flux and a resin binder. The hardfacing is applied by melting an end of the rod on the face of the tooth. The steel tube melts as it is welded to the steel tooth and provides the matrix for the carbide particles. The deoxidizer alloys with the mild steel of the tube.

Although mild steel sheet is used when forming the tubes, the steel in the hardfacing on a finished a rock bit is a hard, wear resistant alloy steel. The conversion from a mild steel to the hard, wear resistant alloy steel occurs when the deoxidizers (which contain silicon and manganese) in the filler and tungsten, carbon, and possibly cobalt, from the tungsten carbide dissolve and mix with the steel during welding. There may also be some mixing with alloy steel from the teeth on the cone.

Advances in wear resistance of hardfacing are desirable to enhance the footage a drill bit can drill before becoming dull, and to enhance the rate of penetration of such drill bits. Such improvements translate directly into a reduction of drilling expenses. The composition of a hardfacing material and the physical structure of the hardfacing material applied to the surfaces of a drill bit are related to the degree of wear resistance and toughness. It is desirable to have a composition of hardfacing material that, when applied to wear surfaces, provides improved wear resistance and toughness while remaining relatively simple to apply to teeth.

SUMMARY OF INVENTION

In one aspect, the present invention relates to a hardfacing composition for a drill bit, including a carbide phase comprising from about 50% to about 80% by weight of the hardfacing composition of a combination of 80 to 200 mesh macro-crystalline tungsten carbide and 80 to 200 mesh crushed cast carbide, the crushed cast carbide being about 5% to 50% by weight of the total weight of the carbide phase, and a binder alloy comprising about 20% to about 50% by weight of the hardfacing composition is disclosed.

In another aspect, the present invention relates to a roller cone drill bit, including a bit body, and at least one roller cone rotatably mounted to the bit body, the at least one roller cone comprising at least one cutting element. The at least one cutting element further has hardfacing on at least an exterior surface, the hardfacing including a carbide phase comprising from about 50% to about 80% by weight of the hardfacing, a combination of 80 to 200 mesh macro-crystalline tungsten carbide and 80 to 200 mesh crushed cast carbide, the crushed cast carbide being about 5% to 50% by weight of the total weight of the carbide phase and a binder alloy comprising about 20% to about 50% by weight of the hardfacing.

In another aspect, the present invention relates to a hardfacing composition for a drill bit, including a carbide phase composed sintered tungsten carbide having a particle size from about 80 to 200 mesh that is about 50% to about 80% by weight of the hardfacing composition, and a binder alloy forming about 20% to about 50% by weight of the hardfacing composition.

In another aspect, the present invention relates to a roller cone drill bit, including a bit body, at least one roller cone rotatably mounted to the bit body, the at least one roller cone including at least one cutting element, the at least one cutting element having hardfacing on at least an exterior surface, the hardfacing including a carbide phase including sintered tungsten carbide having a particle size from about 80 to 200 mesh that is about 50% to about 80% by weight of the hardfacing composition; and a binder alloy forming about 20% to about 50% by weight of the hardfacing composition.

Other aspects and advantages of the invention will be apparent from the following description and the appended claims.

BRIEF DESCRIPTION OF DRAWINGS

FIGS. 3a and 3b show a comparison of the wear resistance of a conventional roller cone rock bit and embodiments of the present invention.

DETAILED DESCRIPTION

Figure 1:
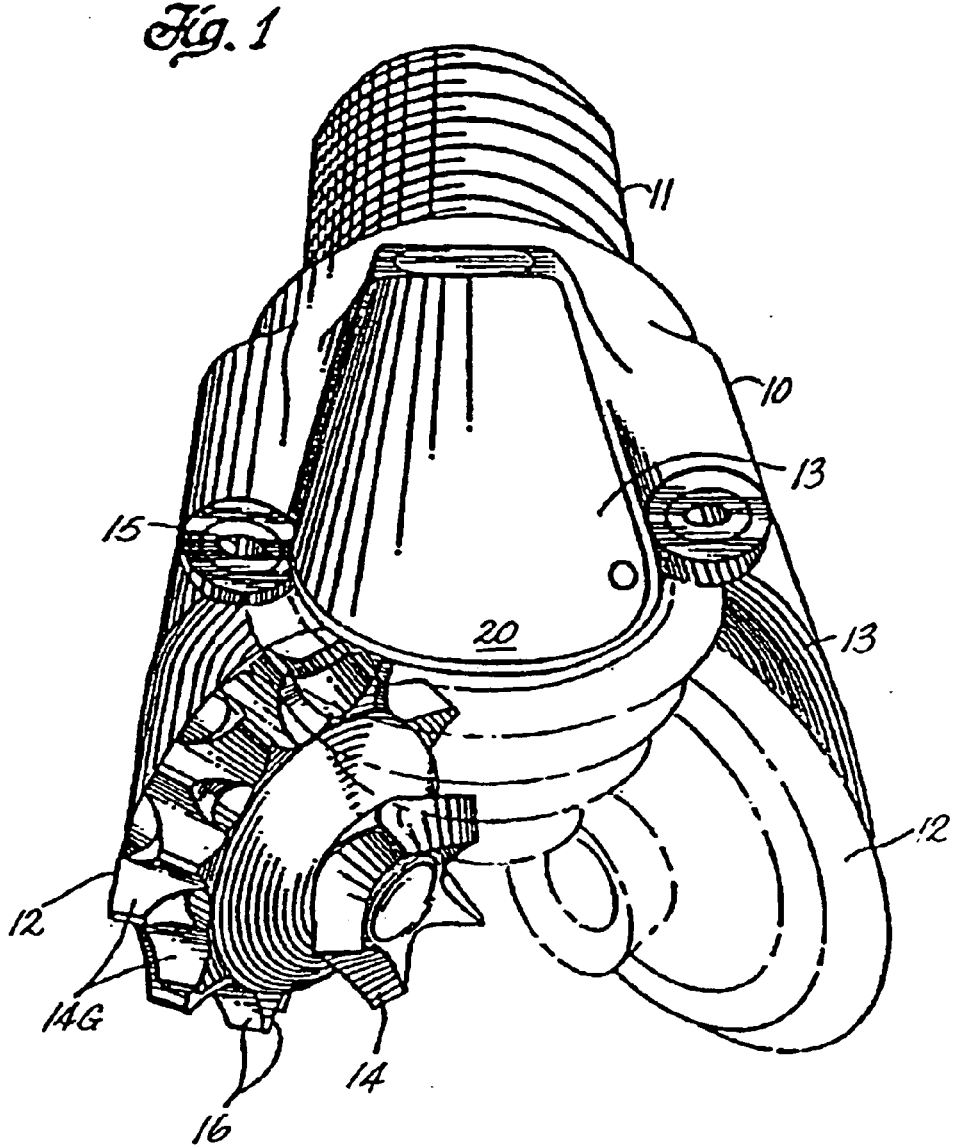
FIG. 1 shows an example of a milled tooth roller cone rock bit.

The present invention relates to hardfacing compositions which use mixtures of crushed cast carbides carbides and macrocrystalline carbide. The addition of crushed cast carbide and macrocrystalline carbides has been found to provide unexpectedly good welding properties, with less porosity while providing improved toughness with adequate wear resistance as compared to prior art macrocrystalline hardfacing compositions. The present invention also relates to hardfacing compositions using sintered pellets having a particle size of between 80–200 mesh. The compositions using sintered pellets were found to improve wear and toughness significantly.

An example of a milled tooth roller cone drill bit includes a steel body 10 having a threaded coupling ("pin") 11 at one end for connection to a conventional drill string (not shown). At the opposite end of the drill bit body 10 there are three roller cones 12, for drilling earth formations to form an oil well or the like ("wellbore"). Each of the roller cones 12 is rotatably mounted on a journal pin (not shown in FIG. 1) extending diagonally inwardly on each one of the three legs 13 extending downwardly from the bit body 10. As the bit is rotated by the drill string (not shown) to which it is attached, the roller cones 12 effectively roll on the bottom of the wellbore being drilled. The roller cones 12 are shaped and mounted so that as they roll, teeth 14 on the cones 12 gouge, chip, crush, abrade, and/or erode the earth formations (not shown) at the bottom of the wellbore. The teeth 14G in the row around the heel of the cone 12 are referred to as the "gage row" teeth. They engage the bottom of the hole being drilled near its perimeter or "gage." Fluid nozzles 15 direct drilling fluid ("mud") into the hole to carry away the particles of formation created by the drilling.

Such a roller cone rock bit as shown in FIG. 1 is conventional and is therefore merely one example of various arrangements that may be used in a rock bit which is made according to the invention. For example, most roller cone rock bits have three roller cones as illustrated in FIG. 1. However, one, two and four roller cone drill bits are also known in the art. Therefore, the number of such roller cones on a drill bit is not intended to be a limitation on the scope of the invention. The arrangement of the teeth 14 on the cones 12 shown in FIG. 1 is just one of many possible variations. In fact, it is typical that the teeth on the three cones on a rock bit differ from each other so that different portions of the bottom of the hole are engaged by each of the three roller cones so that collectively the entire bottom of the hole is drilled. A broad variety of tooth and cone geometries are known and do not form a specific part of this invention, nor should the invention be limited in scope by any such arrangement.

Figure 2:
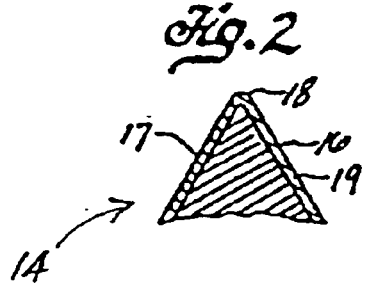
FIG. 2 shows a cross-section of an example of a milled tooth.

The example teeth on the roller cones shown in FIG. 1 are generally triangular in a cross-section taken in a radial plane of the cone. Referring to FIG. 2, such a tooth 14 has a leading flank 16 and a trailing flank 17 meeting in an elongated crest 18. The flank of the tooth 14 is covered with a hardfacing layer 19. Sometimes only the leading face of each such tooth 14 is covered with a hardfacing layer so that differential erosion between the wear-resistant hardfacing on the front flank of a tooth and the less wear-resistant steel on the trailing face of the tooth tends to keep the crest of the tooth relatively sharp for enhanced penetration of the rock being drilled.

The leading flank 16 of the tooth 14 is the face that tends to bear against the undrilled rock as the rock bit is rotated in the wellbore. Because of the various cone angles of different teeth on a roller cone relative to the angle of the journal pin on which each cone is mounted, the leading flank on the teeth in one row on the same cone may face in the direction of rotation of the bit, whereas the leading flank on teeth in another row may on the same cone face away from the direction of rotation of the fit. In other cases, particularly near the axis of the bit, neither flank can be uniformly regarded as the leading flank and both flanks may be provided with a hardfacing. In some drill bits, hardfacing may be applied on the shirttail (20 in FIG. 1) at the bottom of each leg on the bit body.

There are also times when the ends of a tooth, that is, the portions facing in more or less an axial direction on the cone, are also provided with a layer of hardfacing. This is particularly true on the gage surface of the bit which is often provided with a hardfacing. The gage surface is a generally conical surface at the heel of a cone which engages the side wall of a hole as the bit is used. The gage surface includes the outer end of teeth in the gage row of teeth nearest the heel of the cone and may include additional area nearer the axis of the cone than the root between the teeth. The gage surface is not considered to include the leading and trailing flanks of the gage row teeth. The gage surface encounters the side wall of the hole in a complex scraping motion which induces wear of the gage surface.

Embodiments of the present invention relate to the compositions of hardfacing materials for application to rock bits, including milled tooth cutter cones. The hardfacing materials according to the invention comprise crushed cast carbide particles and macrocrystalline carbide. These carbides are applied in some embodiments as a filler in a steel tube. The hardfacing materials may further comprise a deoxidizer and a resin. When these materials are applied to drill bits, the carbide particles are generally suspended in a matrix of alloy steel welded to the drill bits.

The hardfacing layer may be applied to the teeth and/or shirttail using processes well known in the art. One such process is atomic hydrogen welding. Another process is oxyacetylene welding. Other processes include plasma transferred arc ("PTA"), gas tungsten arc, and shield metal arc processes, among other thermal deposition processes. In oxyacetylene welding, for example, the hardfacing material is typically supplied in the form of a tube or hollow rod ("a welding tube") that is filled with granular material of a selected composition. The tube is usually made of steel (iron) or a similar metal (e.g., nickel or cobalt) that can act as a binder when the rod and its granular contents are heated. The tube thickness is selected so that its metal forms a selected fraction of the total composition of the hardfacing material that is applied to the drill bit. The granular filler of the rod or tube typically includes various forms of metal carbides (e.g., tungsten, molybdenum, tantalum, niobium, chromium, and vanadium carbides), and, most typically, various forms of tungsten carbide. Alternatively, the binder alloy may be in the form of a wire ("a welding wire") wherein the hardfacing materials are coated on the wire using resin binders. With a PTA welding process, the hardfacing materials may be supplied in the form of a welding tube, a welding wire, or a powder, although the powder form is preferred.

As discussed earlier, cast tungsten carbide is an eutectic mixture of bitungsten carbide, $W_2C$, and monotungsten carbide, WC. The cast carbide is typically made by resistance heating tungsten in contact with carbon in a graphite crucible having a hole through which the resultant eutectic mixture drips. The liquid is quenched in a bath of oil and is subsequently crushed and comminuted to a desired particle size.

Also, as discussed above, cemented tungsten carbide, also known as sintered tungsten carbide, comprises small particles of tungsten carbide (e.g., 1 to 15 microns) bonded together with cobalt. Cemented tungsten carbide is produced by mixing organic wax, tungsten carbide and cobalt powders, pressing the mixed powders to form a green compact, and "sintering" the composite at temperatures near the melting point of cobalt.

Another type of tungsten carbide is macro-crystalline carbide. This material is essentially stoichiometric WC. Most of the macro-crystalline tungsten carbide is in the form of single crystals, but some bicrystals of WC may also form in larger particles. Single crystal monotungsten carbide is commercially available from, for example, Kennametal, Inc., of Fallon, Nev.

Carbide particles are often measured in a range of mesh sizes, for example 40 to 80 mesh. The term "mesh" generally refers to the size of the wire mesh used to screen the carbide particles. For example, "40 mesh" indicates a wire mesh screen with forty holes per linear inch, where the holes are defined by the crisscrossing strands of wire in the mesh. The hole size is determined by the number of meshes per inch and the wire size. The mesh sizes referred to herein are standard U.S. mesh sizes. A standard 40 mesh screen has holes such that only particles having a dimension less than 420 $\mu$m (micrometers) can pass. That is, particles larger than 420 $\mu$m in size will be retained on the 40 mesh screen, while particles smaller than 420 $\mu$m will pass through the screen.

Therefore, the range of sizes of the carbide particles in a filler is defined by the largest and smallest grade of mesh used to screen the particles. An exemplary filler comprising carbide particles in a range from 16 to 40 mesh will only contain particles larger than 420 $\mu$m and smaller than 1190 $\mu$m, whereas another filler comprising particles in a range from 40 to 80 mesh will only contain particles larger than 180 $\mu$m and smaller than 420 $\mu$m. Hence, there is no overlap in terms of particle size between these two ranges.

In addition to the carbide in the tube filler, it is desirable to include up to five percent by weight of deoxidizer and a temporary resin binder. A suitable deoxidizer includes silicomanganese obtained from Chemalloy in Bryn Mawr, Pa. A typical composition of the silicomanganese is 65% to 68% manganese, 15% to 18% silicon, a maximum of 2% carbon, a maximum of 0.05% sulfur, a maximum of 0.35% phosphorus, and a balance comprising iron. Preferably, about four percent deoxidizer is used. A small amount of thermoset resin is desirable for partially holding the particles together in the tube so that they do not simply fall out during welding. A half percent by weight of resin is adequate. The term "deoxidizer" as used herein refers generally to deoxidizer with or without the resin.

The proportion of filler ("carbide phase") to the steel tube ("binder alloy") in embodiments of the invention comprises about 50–80% carbide phase and about 20–50% binder alloy. All percentages given are pre-application ratios. The proportions can be controlled, for example, by using steel tubes of different thickness and diameter. For example, to obtain a 70:30 weight ratio of filler to steel, a 5/32 inch (4 mm) diameter tube is made with steel having a wall thickness of 0.017 inch (0.43 mm). Alternatively, a 3/16 inch (4.5 mm) diameter steel tube with a wall 0.02 inch (0.5 mm) thick will produce roughly the same weight ratio.

According to some embodiments of the present invention, compositions of the hardfacing materials include tungsten carbides (carbide phase) in the form of crushed cast carbide, preferably having a particle size in a range of about 80–200 ASTM mesh, and macrocrystalline carbide, having a particle size in a range of about 80–200 mesh. In some embodiments of the invention, the carbide phase of the hardfacing composition makes up from about 50% to about 80%, preferably from about 65% to about 70%, by weight of the total hardfacing composition. Of the total carbide phase, about 5% to 50% of the total weight of the carbide phase comprises the cast carbide.

More preferably, the cast carbide represents 20% to 40% of the total weight of the carbide phase. The remainder of the composition includes binder alloy that, as explained above, can be in the form of metal in the welding tube or rod or in powder form if welding process such as PTA are used. Moreover, the binder alloy may include a deoxidizer/resin of a type known in the art. Typically, the deoxidizer/resin will form no more than about 5%, preferably about 4%, by weight of the total hardfacing composition.

In one embodiment of the present invention, a carbide phase comprising 70% of the overall weight of the hardfacing composition was used. In this embodiment, the carbide phase was comprised of 50% macrocrystalline tungsten carbide having a particle size of 80–200 mesh and 50% of crushed cast tungsten carbide having a particle size of 80–200 mesh. FIGS. 3a and 3b show a comparison between a typical prior art hardfacing composition (shown as number 1 in FIGS. 3a and 3b) and one embodiment of the present invention (shown as number 2 in FIGS. 3a and 3b). Specifically, the prior art hardfacing composition uses 70% by weight of 80–200 mesh macrocrystalline tungsten carbide in combination with 30% binder material. FIGS. 3a and 3b show a comparison of high stress wear and low stress wear, respectively, between embodiments of the present invention (numbers 2 and 3) and a typical prior art hardfacing composition (1). The applicable ASTM testing methods are referenced in the headings of the Figures. As can be seen from FIGS. 3a and 3b, incorporation of crushed cast tungsten carbide can improves the wear resistance of the hardfacing composition. In addition, the composition including the crushed cast tungsten carbide is easier to weld, with less porosity and void content, relative to the prior art composition.

According to some embodiments of the present invention, compositions of the hardfacing materials include tungsten carbides (carbide phase) in the form of sintered tungsten carbide/cobalt pellets having a particle size in a range of about 80–200 ASTM mesh. In some embodiments of the invention, the carbide phase of the hardfacing composition makes up from about 50% to about 80%, preferably from about 65% to about 70%, by weight of the total hardfacing composition.

The remainder of the composition includes binder alloy that, as explained above, can be in the form of metal in the welding tube or rod or in powder form if welding process such as PTA are used. Moreover, the binder alloy may include a deoxidizer/resin of a type known in the art. Typically, the deoxidizer/resin will form no more than about 5%, preferably about 4%, by weight of the total hardfacing composition.

In another embodiment of the present invention, a carbide phase comprising 70% of the overall weight of the hardfacing composition was used. In this embodiment, the carbide phase comprised sintered tungsten carbide having a particle size of 80–200 mesh. FIGS. 3a and 3b show a comparison between a typical prior art hardfacing composition (shown as number 1 in FIGS. 3a and 3b) and the above described embodiment of the present invention (shown as number 3 in FIGS. 3a and 3b). Specifically, the prior art hardfacing composition uses 70% by weight of 80–200 mesh macrocrystalline tungsten carbide in combination with 30% binder material. As can be seen from FIGS. 3a and 3b, sintered carbide having a particle size of between 80–200 mesh considerably improves both the wear resistance and the toughness of the hardfacing composition. The welding of the sintered material can be best achieved by PTA or other high energy processes.

Embodiments of the invention are found to have better wear resistance and toughness. Moreover, the inclusion of crushed cast carbide improves the weldability of the hardfacing composition. In particular, embodiments of the present invention that use sintered tungsten carbide having a particle size of 80 to 200 mesh have improved wear resistance under both high and low stress conditions. Specifically, embodiments of the present invention result in less rejection and less eta-phase/porosity caused by overheating.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hardfacing composition for a drill bit, comprising:
   a carbide phase comprising from about 50% to about 80% by weight of the hardfacing composition of a combination of 80 to 200 mesh macro-crystalline tungsten carbide and 80 to 200 mesh crushed cast carbide, wherein about 5% to about 50% by weight of the carbide phase comprises the crushed cast carbide; and
   a binder alloy comprising about 20% to about 50% by weight of the hardfacing composition.

2. The hardfacing composition as defined in claim 1, wherein the carbide phase forms from about 65% to about 70% by weight of the hardfacing composition.

3. The hardfacing composition as defined in claim 1, further comprising a deoxidizer in an amount of at most about 5% by weight of the hardfacing composition.

4. The hardfacing composition as defined in claim 1, wherein the cast carbide phase forms about 20% to about 40% by weight of the carbide phase.

5. A roller cone drill bit, comprising:
   a bit body; and
   at least one roller cone rotatably mounted to the bit body, the at least one roller cone comprising at least one cutting element, the at least one cutting element having hardfacing on at least an exterior surface, the hardfacing comprising
   a carbide phase comprising from about 50% to about 80% by weight of the hardfacing, a combination of 80 to 200 mesh macro-crystalline tungsten carbide and 80 to 200 mesh crushed cast carbide, wherein about 5% to about 50% by weight of the carbide phase comprises the crushed cast carbide; and
   a binder alloy comprising about 20% to about 50% by weight of the hardfacing.

6. The drill bit as defined in claim 5, wherein the hardfacing composition further comprises a deoxidizer in an amount of at most about 5% by weight of the hardfacing.

7. The drill bit as defined in claim 5, wherein the carbide phase forms from about 65% to about 70% by weight of the hardfacing.

8. The drill bit as defined in claim 5, wherein the cast carbide phase forms about 20% to about 40% by weight of the carbide phase.

* * * * *